(12) United States Patent
James (10) Patent No.: US 12,117,775 B2
(45) Date of Patent: Oct. 15, 2024

(54) ELECTRONIC WRIST OR POCKET WATCH COMPRISING A ROTARY CROWN

(71) Applicant: Saronikos Trading and Services, Unipessoal LDA, Madeira (PT)

(72) Inventor: Robert James, Hatfield (GB)

(73) Assignee: Saronikos Trading and Services, Unipessoal LDA, Madeira (PT)

( * ) Notice: Subject to any disclaimer, the term of this patent is extended or adjusted under 35 U.S.C. 154(b) by 0 days.

(21) Appl. No.: 15/561,421

(22) PCT Filed: Mar. 27, 2015

(86) PCT No.: PCT/EP2015/056765
§ 371 (c)(1),
(2) Date: Sep. 25, 2017

(87) PCT Pub. No.: WO2016/155761
PCT Pub. Date: Oct. 6, 2016

(65) Prior Publication Data
US 2018/0059624 A1    Mar. 1, 2018

(51) Int. Cl.
*G04B 47/06* (2006.01)
*G04B 3/04* (2006.01)
(Continued)

(52) U.S. Cl.
CPC .............. *G04B 47/06* (2013.01); *G04B 3/041* (2013.01); *G04C 3/001* (2013.01); *G04G 21/00* (2013.01);
(Continued)

(58) Field of Classification Search
CPC ........ G04B 47/06; G04B 3/041; G04C 3/001; G04G 21/00; G04G 21/08; G04G 99/006
See application file for complete search history.

(56) References Cited

U.S. PATENT DOCUMENTS

| 4,336,609 A | 6/1982 | Kume et al. |
| 2005/0134149 A1* | 6/2005 | Deng .................... H01L 41/113 310/339 |

(Continued)

FOREIGN PATENT DOCUMENTS

| DE | 3903706 A1 * | 8/1989 | ............. G04C 10/00 |
| EP | 1 832 969 A2 | 9/2007 | |

(Continued)

OTHER PUBLICATIONS

Bissinger, Norbert, English Translation of DE 3903706, originally published Aug. 17, 1989, retrieved on May 9, 2020 from Espacenet, full document (Year: 1989).*

(Continued)

*Primary Examiner* — Edwin A. Leon
*Assistant Examiner* — Jason M Collins
(74) *Attorney, Agent, or Firm* — Workman Nydegger (57) ABSTRACT

A watch includes a case, a display for displaying a plurality of symbols, a processor in signal communication with the display, and configured for controlling the display in a manner such that they will display a screen where at least one first symbol is selected among a plurality of available symbols, a rotary crown associated with the case, and a motion detector configured for detecting at least the rotary motion of the crown, wherein the motion detector is in signal communication with the processor, and wherein the processor is also configured for controlling the display in a manner such that, when the crown is turned, at least one other symbol, different from the first symbol, will be selected among a plurality of available symbols.

15 Claims, 5 Drawing Sheets

(51) Int. Cl.
  *G04C 3/00* (2006.01)
  *G04G 21/00* (2010.01)
  *G06F 3/0362* (2013.01)
  *G06F 3/04817* (2022.01)
  *G06F 3/0482* (2013.01)
  *G06F 3/04842* (2022.01)

(52) U.S. Cl.
  CPC ........ *G06F 3/0362* (2013.01); *G06F 3/04817* (2013.01); *G06F 3/0482* (2013.01); *G06F 3/04842* (2013.01)

(56) References Cited

U.S. PATENT DOCUMENTS

| | | | | |
|---|---|---|---|---|
| 2007/0211042 | A1* | 9/2007 | Kim | G04C 3/005 345/184 |
| 2007/0223318 | A1 | 9/2007 | Nobs | |
| 2008/0084792 | A1* | 4/2008 | Hayashi | G04C 3/008 368/80 |
| 2011/0070924 | A1* | 3/2011 | Kim | G06Q 10/02 455/566 |
| 2011/0157046 | A1 | 6/2011 | Lee et al. | |
| 2012/0231853 | A1* | 9/2012 | Takahashi | G06F 3/0482 455/566 |
| 2013/0151966 | A1* | 6/2013 | Neuman | G06F 3/0482 715/716 |
| 2014/0305783 | A1* | 10/2014 | Kagayama | G06F 3/016 200/521 |
| 2014/0306914 | A1* | 10/2014 | Kagayama | G06F 3/016 345/173 |
| 2014/0328147 | A1* | 11/2014 | Yang | G04G 17/04 368/69 |
| 2015/0168178 | A1* | 6/2015 | Hoover | G01D 5/34746 368/321 |
| 2016/0058375 | A1* | 3/2016 | Rothkopf | G04G 21/025 600/323 |

FOREIGN PATENT DOCUMENTS

| | | | | |
|---|---|---|---|---|
| KR | 10-2014-0066822 A | | 6/2014 | |
| WO | WO-2009084368 A1 | * | 7/2009 | ......... G06F 3/04817 |
| WO | 2014/143373 A1 | | 9/2014 | |
| WO | WO 2015034965 A1 | * | 3/2015 | ............. G04G 21/00 |

OTHER PUBLICATIONS

Iguchi, Fukuya, English Translation of WO2009084368, originally published on Jul. 9, 2009, retrieved from Espacenet on Jul. 7, 2023, full document (Year: 2009).*

International Search Report and Written Opinion dated Jun. 3, 2016, issued in PCT application No. PCT/EP2015/056765, filed Mar. 27, 2015.

* cited by examiner

ELECTRONIC WRIST OR POCKET WATCH COMPRISING A ROTARY CROWN

BACKGROUND OF THE INVENTION

1. The Field of the Invention

The present invention relates to an electronic wrist or pocket watch.

2. The Relevant Technology

It is known that latest-generation electronic watches (the so-called smartwatches) allow, in addition to the typical watch functions and multimedia functions, the implementation of interesting applications of any kind, e.g., monitoring the position and/or health and/or physical performance of the people wearing them. In fact, many of these devices are equipped with GPS receivers, gyroscopic sensors for user fall detection, biometric sensors capable of measuring heartbeat intensity, blood pressure, haemoglobin and/or glycemia level, and more.

Such a wide variety of sensors installed in a very narrow space makes these devices particularly suitable for use by a large number of users of any age, i.e., ranging from children to seniors with limited motor capabilities. More in detail, a child wearing a smartwatch equipped with GPS and a GSM/UMTS/LTE data transmission interface can be easily monitored by an adult, e.g., by activating a program that will transmit a short alert text message (SMS) to a telephone number set by the adult him/herself as soon as the GPS receiver detects that the child has crossed a previously set perimeter. Likewise, it is also possible to monitor a senior or a person under house arrest.

In applications for children and seniors one can also check, through the use of an electronic gyroscope, that the users of the device have not fallen and/or are not lying in a horizontal position (perhaps because of a fall); these people, should they fall, may also use the smartwatch to make or receive a (video) call, so that the supervisor (i.e., the parent and/or the nurse) can verify the child's and/or senior's health conditions.

Another smartwatch application which is very useful especially for elderly people, but also for amateur and/or professional athletes, concerns the monitoring of biometrical parameters (heartbeat, blood oxygenation, glycemia level, or the like) through sensors positioned in the strap or in the back part of the case of the smartwatch. In fact, these people can monitor their physical condition and, most importantly, they can be monitored remotely.

As can be inferred from the short application descriptions provided above, smartwatches can be potentially used by many people with uneven computer alphabetization. In fact, a person aged between twenty and forty will have no difficulty (thanks to his/her smartphone experience) in using a smartwatch equipped with a touchscreen, whereas a person older than eighty might find it hard to learn, remember and execute the gestures (such as, for example, tapping, sliding, pinching/stretching) required for using a touchscreen-equipped smartwatch; this latter category of people are not, in fact, particularly accustomed to using a smartphone, while they are accustomed to using analog wrist or pocket watches. Therefore, due to their dimensions and to their similarity to traditional analog watches, smartwatches could be used more by these people (and not only by them) than smartphones, if only their use were more resemblant to that of traditional analog watches.

A further problem related to smartwatches is that, since the dial must show many icons at the same time, the latter must be small, resulting in reading and selection difficulties.

SUMMARY OF THE INVENTION

The present invention aims at solving these and others problems by providing a wrist-worn electronic device as set forth in the appended claim 1.

The present invention is based on the idea of providing a wrist-worn or pocket-worn electronic device with a rotary crown similar in shape and size to those of a traditional analog watch, and motion detection means configured for detecting the motion of said crown, wherein said motion detection means are in signal communication with processing means configured for controlling display and selection means, so that, when the crown is turned, the symbols (such as, for example, icons, digits, letters of an alphabet, or the like) will be highlighted one after the other.

Further advantageous features of the present invention will be set out in the appended claims.

BRIEF DESCRIPTION OF THE DRAWINGS

These features as well as further advantages of the present invention will become more apparent from the following description of an embodiment thereof as shown in the annexed drawings, which are supplied by way of non-limiting example, wherein.

DETAILED DESCRIPTION OF THE PREFERRED EMBODIMENTS

In this description, any reference to "an embodiment" will indicate that a particular configuration, structure or feature is comprised in at least one embodiment of the invention. Therefore, the phrase "in an embodiment" and other similar phrases, which may be present in different parts of this description, will not necessarily be all related to the same embodiment. Furthermore, any particular configuration, structure or feature may be combined in one or more embodiments in any way deemed appropriate. The references below are therefore used only for simplicity's sake, and do not limit the protection scope or extension of the various embodiments.

Figure 1:
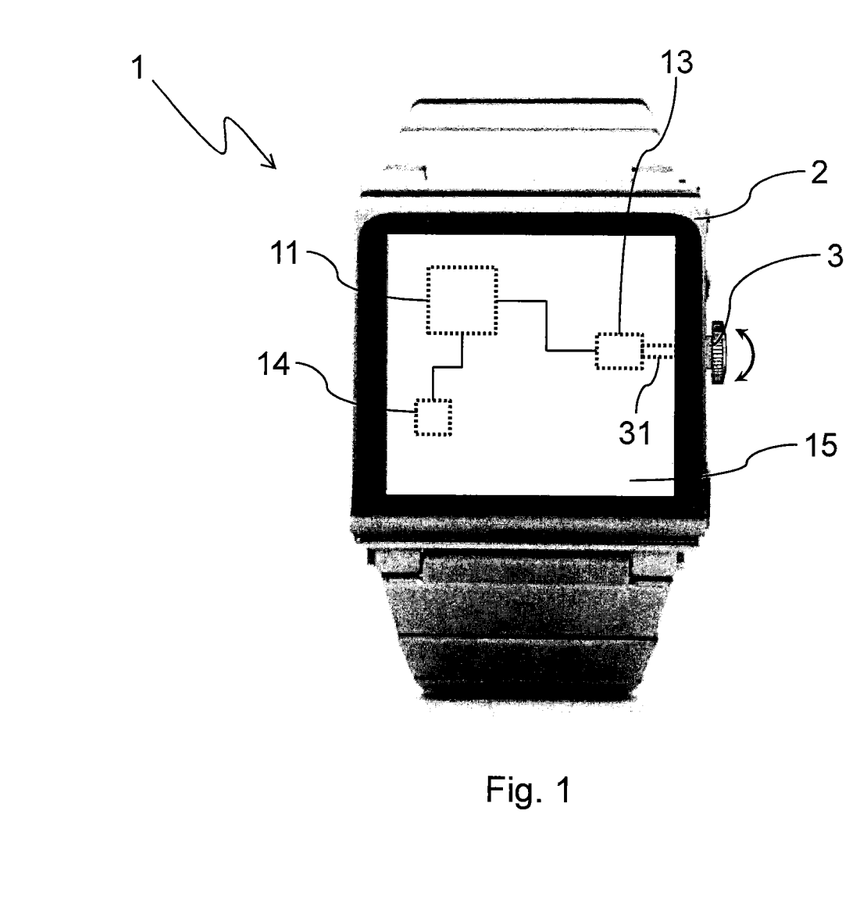
FIG. 1 is a front view of a wrist-worn electronic device according to the invention, highlighting in transparency some of the components contained therein.
Figure 2:
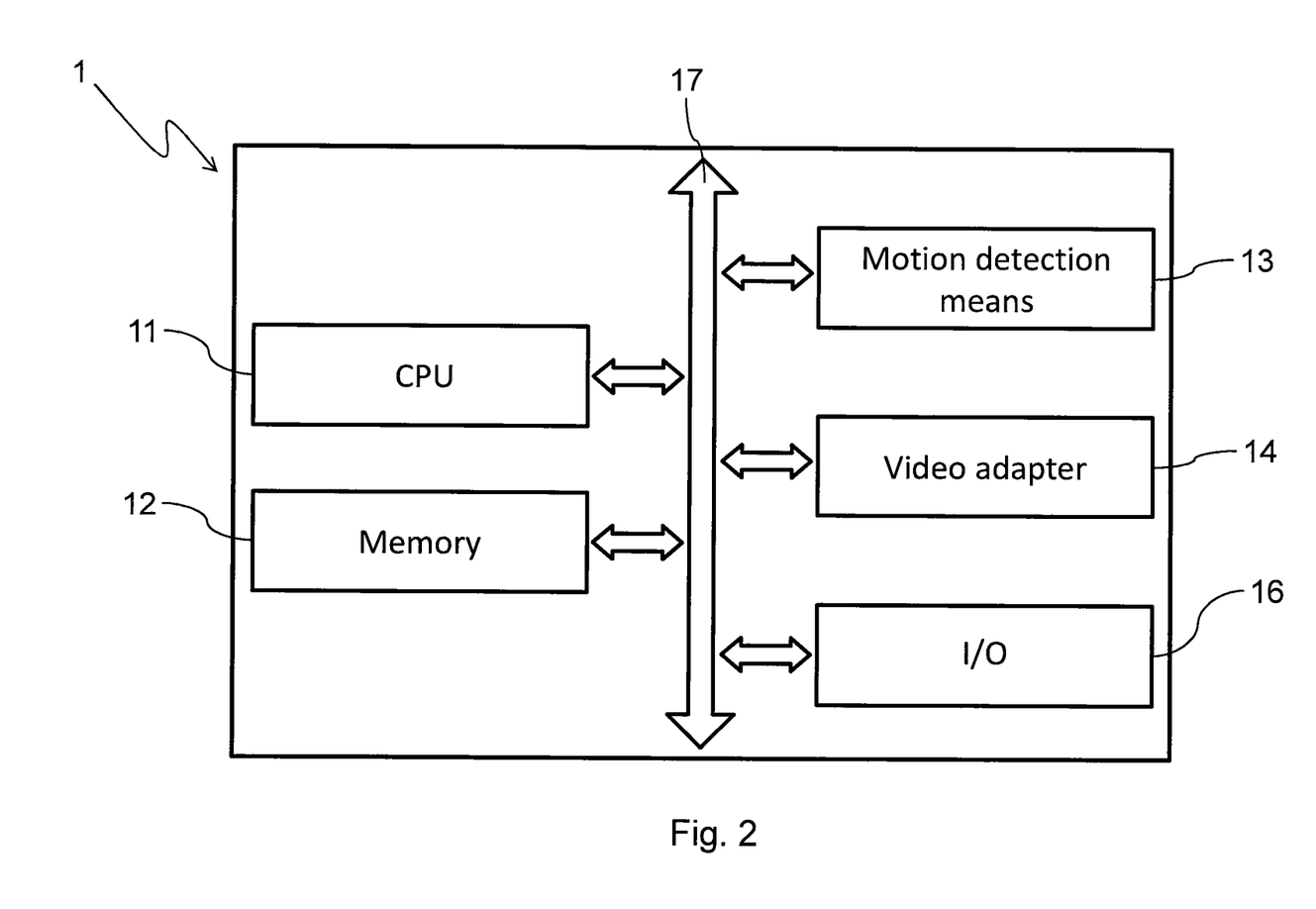
FIG. 2 shows a block diagram of the hardware architecture of the wrist-worn electronic device of FIG. 1.

With reference to FIGS. 1 and 2, an embodiment of the wrist-worn electronic device 1 (also referred to as smartwatch) according to the invention comprises the following components:

- a case 2, preferably having a similar shape and being made of a similar material as a wrist watch according to the prior art, so modelled as to contain at least a part of the components of the device 1, and having apertures ensuring proper accommodation and vision of the components with which the user of said device will have to interact;

a crown 3, preferably similar in shape and size to the crown employed in an analog wrist watch according to the prior art, positioned on one side externally to the case 2, so that it can be at least turned by a user of the device 1;

a strap 4 preferably similar in shape, dimensions and material to that of a wrist watch according to the prior art, allowing a user to wear said device 1;

processing means 11, e.g., a processor (CPU), governing the operation of the device 1, preferably in a programmable manner, through the execution of suitable instructions;

memory means 12, preferably a Flash memory or the like, in signal communication with the processing means 11, wherein the memory means 12 store at least the instructions that can be read by the processing means 11 when the device 1 is in an operating condition;

motion detection means 13 (e.g., an encoder of any one of the following types: capacitive/inductive, magnetic, potentiometric, optical), configured for detecting the motion of said crown 3, preferably for detecting the direction and the number of degrees (or radiants) of rotation imparted to the crown 3, wherein said motion detection means 13 are in signal communication with the processing means 11, and wherein said means 13 are preferably mechanically coupled to the crown 3 through a transmission shaft 31 similar in shape and size to that of a winding and control shaft of a traditional analog watch;

a video adapter 14 in signal communication with the processing means 11, and configured for receiving at its input display instructions generated by the processing means 11 and for outputting a video signal; wherein the video signal may also be a static image;

display means 15 (e.g., a liquid crystal display or the like), preferably having a size comprised between 0.8 and 2 inches, in signal communication with the video adapter 14, and configured for displaying the video signal in a manner such that it can be visually perceived by the user of the device 1;

input/output (I/O) means 16, which can be used, for example, for connecting said device 1 to peripherals such as positioning means (not shown in the annexed drawings), e.g., consisting of a GPS receiver external or internal to the case 2, or for connecting the device 1 to a (GSM/UMTS/LTE) cellular telephone and/or data network and/or to a wireless network; for this purpose, the input/output means 14 may comprise, for example, USB, Firewire, RS232, IEEE 1284, Ethernet, WiFi or other adapters;

a communication bus 17, allowing the exchange of information among the processing means 11, the memory means 12, the motion detection means 13, the video adapter 14, and the input/output (I/O) means 16.

As an alternative to using the communication bus 17, the processing means 11, the memory means 12, the motion detection means 13, the video adapter 14 and the input/output (I/O) means 16 can be connected by means of a star architecture.

The motion detection means 13 may also be provided not only as encoders (as mentioned above), but also by means of mechanical components comprising at least one toothed wheel driven by the shaft 31 and a pair of monostable microswitches positioned in such a way that the toothed wheel, when rotated by the crown 3, will actuate only one of said microswitches depending on the direction of rotation of the crown 3. With this configuration, in fact, the direction of rotation of the crown 3 can be detected on the basis of the microswitch actuated by the toothed wheel, while the number of degrees of rotation of the crown 3 can be estimated on the basis of the number of rising and/or falling wavefronts outputted by the microswitch actuated by the toothed wheel.

It must be pointed out that the strap 4 may be replaced with a string or other constraining means; in fact, the device 1 may also be shaped as a pocket watch or another type of watch.

The display means 15 may also comprise a touch-sensitive surface, thus allowing the user to interact with the device 1; to this end, this surface is in signal communication with the processing means 11 through means that are well known in the art.

Figure 3:
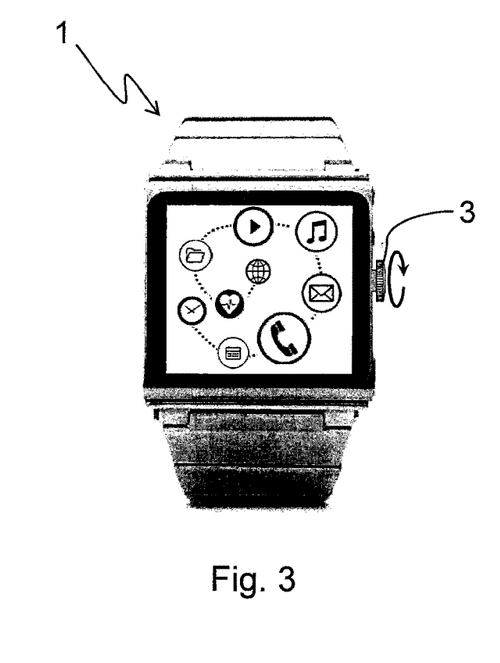
FIGS. 3-5 are front views of the wrist-worn device of FIG. 1 in different operating conditions.
Figure 4:
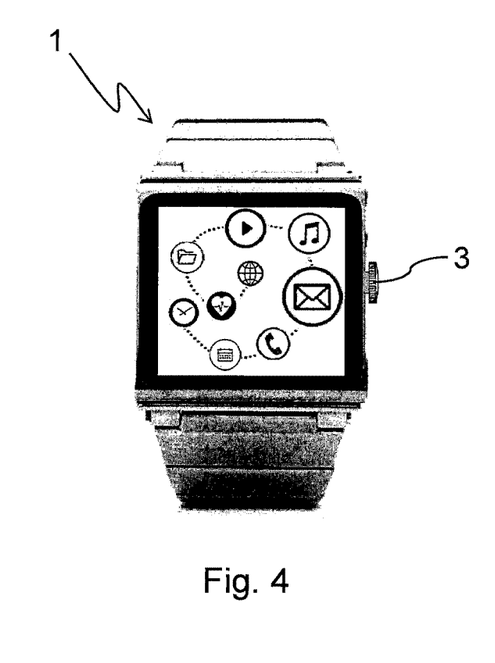
Figure 5:
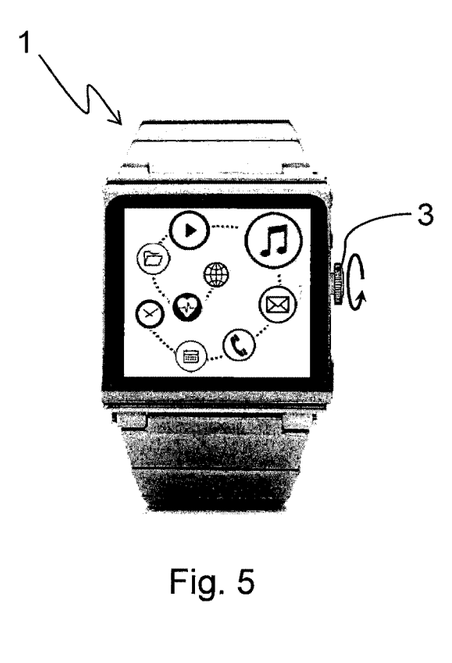

Also with reference to FIGS. 3-5, when the device 1 is in an operating condition, the processing means 11 transmit to the video adapter 14 display information that will cause the video adapter 14 to generate a video signal which, when displayed by the display means 15, will generate a screen preferably comprising at least a plurality of symbols. These symbols are preferably graphic icons, but they may also be numbers, characters of an alphabet, generic elements of a list, or the like.

Reference will be made below to said symbols by using the term 'icons', so that this description will be consistent with the annexed drawings.

With each one of said icons (symbols) an application is associated, through which, once it has been started (e.g., by touching the area of the screen 15 displaying said icon), activities of various kinds can be carried out.

In FIGS. 3-5, the exemplary screen displayed by the device 1 comprises nine icons (symbols), each one of which has a shape related to the application with which it is associated. More in detail, the applications that can preferably be activated by the icons shown in the exemplary screen are the following (from the outermost one to the innermost one along the dotted line): clock, calendar, cellular telephone, electronic mail, audio playback, video playback, document folders, measurement of the user's vital parameters, and map display.

The device 1 is configured for allowing the user of said apparatus to select an icon by turning the crown 3; that icon can then be activated (e.g., by touching the portion of the touchscreen 15 where said icon is displayed), thereby starting the application associated with said icon.

In order to let the user know which icon has been selected, the icon can be highlighted in different ways. For example, the selected icon may be displayed bigger than normal (as can be seen in FIGS. 3, 4, 5, wherein the selected icons are those associated with the cellular telephone, electronic mail and audio playback applications, respectively). As an alternative to or in combination with the above, another way of highlighting the selected icon may be to display said icon in a different colour and/or in a particular position on the screen (e.g., near the crown 3, just like the date in traditional analog watches).

In summary, when the user of the device 1 turns the crown 3 upwards or downwards and the device 1 is in an operating condition, the shaft 31 will transfer this rotary motion to the motion detection means, which will generate a rotation signal that will be sent to the processing means 11, which will read said signal and generate suitable display instructions to be transmitted to the video adapter 14, which will then generate a video signal that, when displayed by the display means 15, will generate a screen in which the selected icon will be different from the one previously selected. This mode of operation makes the operation of the device 1 more similar to that of a traditional analog watch, wherein the crown is used for setting the time and/or the date. In this manner, it is advantageously possible to widen the potential number of users of the device 1, because learning times and difficulties will be reduced for those users who have gained experience with traditional analog watches but not with smartphones.

For the purpose of further reducing the learning times and difficulties for these users, the icons may be displayed on the display means 15 along a spiral trajectory, so that the rotation of the crown 3 will cause the sequential selection (and highlighting) of the icons arranged along said trajectory (as shown in FIGS. 3-5) and/or the movement of the icons along the spiral trajectory; both movements can, in fact, be easily associated with those made by the hands of a traditional analog watch when one is setting the time by turning the crown.

More in detail, an upward rotation of the crown 3 (in the direction indicated by the arrow in FIG. 3) will produce a counterclockwise icon selection; with reference to the annexed drawings, this will switch the selection from the icon associated with the mobile telephone application (FIG. 3) to the icon associated with the electronic mail application (FIG. 4), and, finally, to the icon associated with the audio playback application (FIG. 5); conversely, the reverse, i.e., clockwise, selection of said icons can be obtained by turning the crown 3 downwards (in the direction indicated by the arrow in FIG. 5). It must be pointed out that the direction of rotation of the crown 3 and the icon selection direction may also be reversed compared to the mode of operation just described, so as to be able to meet the preferences of the user of the device 1.

The spiral trajectory also offers the advantage that the display space available on the screen 15 can be exploited at best, notwithstanding the design constraints imposed by the ergonomics requirements of the device, that do not allow it to be larger than two inches in diagonal. Furthermore, the spiral allows displaying a set of icons in a sequential (as opposed to scattered) pattern, i.e., in a way that resembles the numbers on the analog dial of a traditional analog watch, thus making the operation of the device 1 easier to understand for a larger number of users.

As an alternative to the spiral trajectory, the icons may be displayed (through the display means 15) along a circular trajectory. This shape makes the aspect of the device 1, when in operation, more similar to a traditional analog watch, advantageously increasing the number of potential users of the device 1.

In order to increase the number of icons selectable by the user of the device 1, the processing means 11 may also be configured in a manner such that, for example, when an icon reaches a first point of the trajectory (whether circular or spiral-shaped or of any other shape), turning the crown 3 in one of its two possible directions will cause said icon to disappear from the screen displayed by the display means 15 and a new icon to appear, not previously displayed on the screen, preferably at a second point of said screen; the first point may preferably coincide with the point where, on a dial of a traditional analog watch, there is the symbol of 11 o'clock, while the second point may preferably coincide with the point where, on the same dial, there is the symbol of 12 o'clock.

In combination with the above, the processing means 11 may also be configured in a manner such that, when the crown 3 is turned in the direction opposite to the one referred to above, a new icon (not previously displayed on the screen) will appear preferably at the first point of the trajectory, while the icon preferably displayed at the second point of the screen will disappear.

In this way, the number of displayed icons can be kept lower than a threshold value, so that bigger icons can be used than when all available icons are displayed simultaneously. This makes it easier for the user of the device 1 to select the desired icon without having to enlarge/reduce the screen where the icons are shown. These features provide the device 1 with an appearance which is more similar to that of a traditional analog watch, thus making the device 1 easier to use for a larger number of users. Moreover, with the solution of showing only a part of the available icons and keeping the remaining ones hidden until the user operates the crown 3, the device can be equipped with an unlimited number of icons and functions.

In another embodiment of the invention, in order to make the device 1 even easier to use, when an icon at either end of the spiral trajectory (i.e., one of the icons that in FIGS. 3-5 are associated with the map display or clock applications), turning the crown 3 in one of the two possible directions or in the same direction that caused the selection of said icon will cause the selection of the icon located at the opposite end of the spiral trajectory, thus making the icon selection process similar to the mechanism for selecting the days of the date on a traditional analog watch.

Furthermore, the device 1 may also comprise feedback means (not shown in the annexed drawings) allowing the user to physically feel or hear that the action exerted on the crown 3 has had an effect on the device 1. In particular, the feedback means may comprise a linear actuator, preferably a piezoelectric one, in signal communication with the processing means 11, and capable of causing the device 1 to vibrate in a direction preferably perpendicular to the screen 15, and wherein the processing means 11 may also be configured for actuating said linear actuator every time the motion detection means 13 detect a rotation of the crown 3. As an alternative to or in combination with the linear actuator, the feedback means may also comprise braking means that, by acting upon the shaft 31, will provide a clicking rotary motion of the crown 3, thereby giving the user of the device 1 an indication about the quantity of commands issued to the device 1.

The use of these feedback means advantageously facilitates the use of the device 1 for any user, thus increasing the number of possible users of said device 1.

Of course, the example described so far may be subject to many variations.

Figure 6:
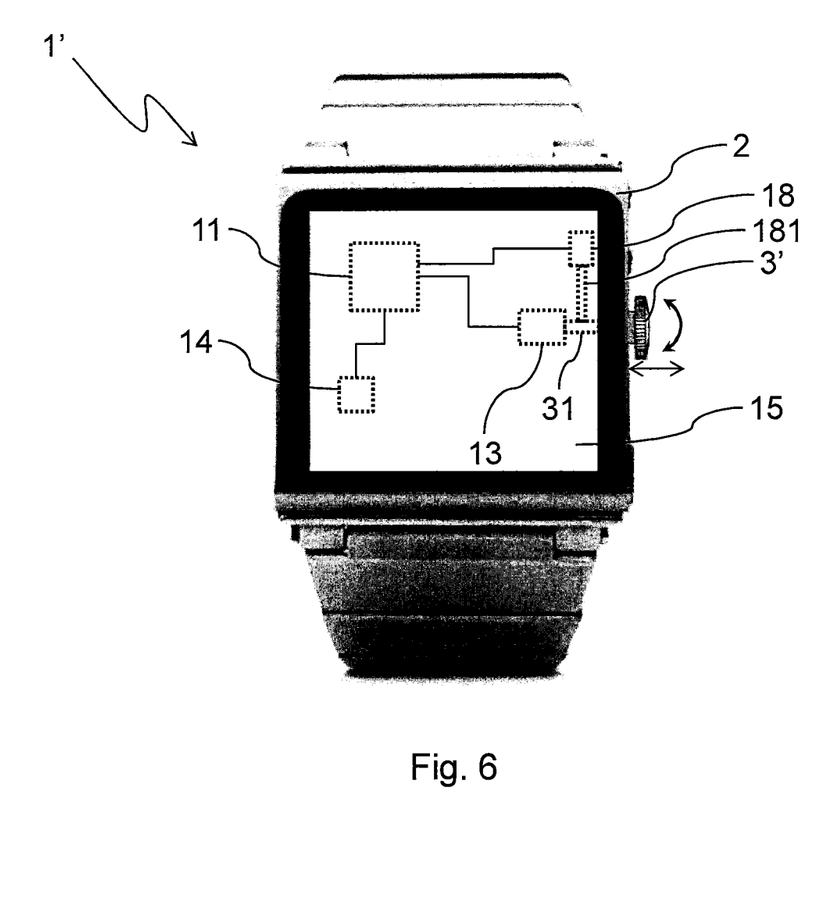
FIG. 6 is a front view of a first variant of the wrist-worn electronic device of FIG. 1.

A first variant is shown in FIG. 6; for simplicity, the following description will only highlight those parts which make this and the next variants different from the above-described main embodiment; for the same reason, wherever possible the same reference numerals, with the addition of one or more apostrophes, will be used for indicating structurally or functionally equivalent elements.

The second embodiment of the invention comprises a device 1' having similar shape and dimensions as the device 1 of the main embodiment; said device 1' differs from the one of the main embodiment for the presence of a crown 3' that, besides being able to rotate about an axis of rotation, is also configured for moving along an axial direction of said axis, thereby generating a movement of extraction/insertion from/into the case 2. This movement can be used, for example, in order to activate the application associated with the selected icon and/or to activate a software program that will allow selecting the icons by turning the crown 3' and/or to make a lateral sliding movement; in order to allow the processing means 11 to detect the extraction and/or insertion movement of the crown 3', the motion detection means 13' of the device 1 may also comprise a translation sensor 18 in signal communication with said processing unit 11, and capable of detecting the extraction and/or insertion movement of the crown 3' imparted by the user and of generating a translation signal to be transmitted to the processing means 11.

In order to detect the translation and/or insertion movement of the crown 3', the sensor 18 may comprise a microswitch (not shown in the annexed drawings) positioned in a manner such as to be actuated by the terminal part of the shaft 31. As an alternative to or in combination with this solution, the sensor 18 may preferably comprise a piezoelectric element 181 coupled to the shaft 31, so that it will be deformed when the user of the device 1 extracts and/or inserts the crown 3', thereby moving the shaft 31. The coupling between the piezoelectric element 181 and the shaft 31 may be provided, for example, by means of a bushing (not shown in the annexed drawings) constrained to the piezoelectric element 31 and to a definite portion of the shaft 31; for this purpose, the shaft 31 may be so shaped as to create a seat that will prevent said bushing from sliding along the entire length of the shaft 31.

When the crown 3' is extracted from and/or inserted into the case 2 by the user, the shaft 31 will move integrally with said crown, thereby deforming the piezoelectric element 181, which will generate an electric potential difference, proportional to the deformation that has occurred, between two portions thereof, to each one of which a terminal is connected; said potential difference can be exploited for generating an electric signal that can be detected by the processing means 11, whether directly and/or through a suitable conversion (e.g., an electric and/or logic adaptation).

The man skilled in the art may however use a translation sensor 18 of another type, without however departing from the teachings of the present invention.

As aforementioned, in this embodiment the processing unit 11 may be configured for entering a selection state (mode) when the user extracts/inserts the crown 3' from/into the case 2 (similarly to what happens in Android and iOS devices when the 'home' key is pressed). When the processing unit 11 enters the selection state (mode), the display means will preferably display a screen comprising a plurality of icons that can be selected one after the other by turning the crown 3', while the application associated with the selected icon can be activated by inserting/extracting the crown 3' into/from the case 2, thus making it unnecessary to use to touch-sensitive screen. This sequence of movements of the crown 3' (extraction/insertion, rotation, insertion/extraction) is similar to the sequence of movements that a user needs to make in order to set the time and/or the date on a traditional analog watch. This further reduces the barriers to use for those users who have no experience with smartphones, thereby increasing the number of potential users of the apparatus 1'.

It must also be pointed out that the crown 3' may also be configured for staying firmly in its position after it has been extracted from and/or inserted into the case 2, so as to make the operation/behaviour of the device even more similar to that of a traditional analog watch.

Figure 7:
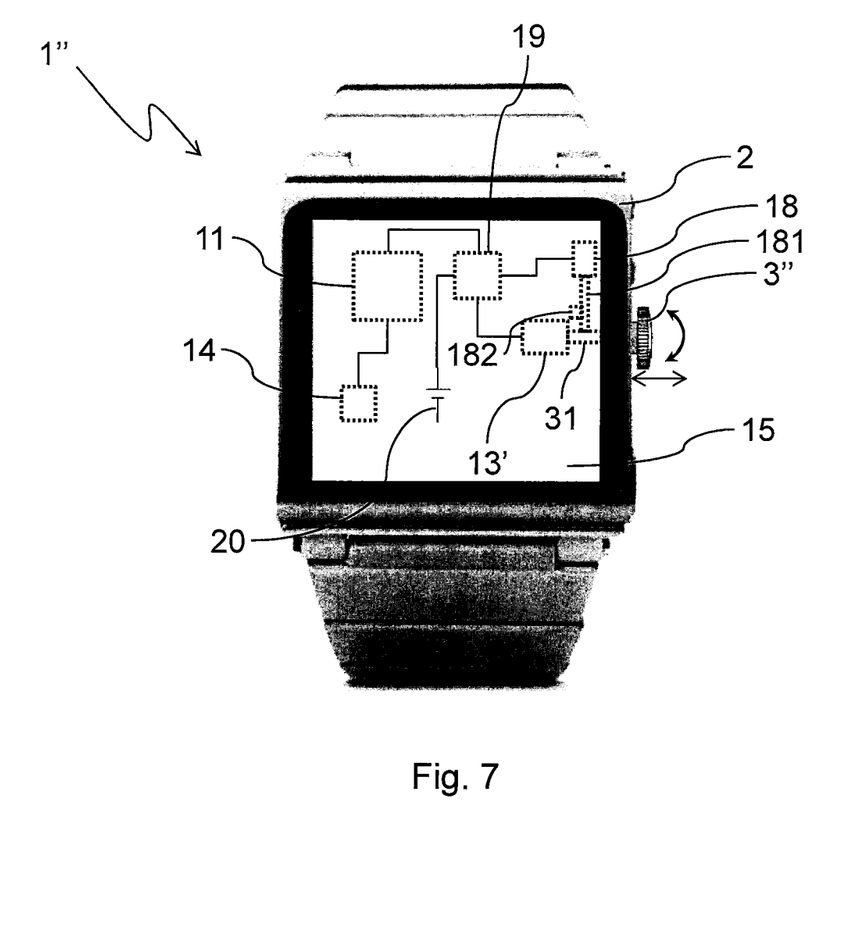
FIG. 7 is a front view of a second variant of the wrist-worn electronic device of FIG. 1.

With reference to FIG. 7, the following will describe a third embodiment of the invention, comprising a device 1" similar to that of the previous embodiments, but characterized in that it also comprises energy recovery means 19 and accumulation means 20 configured for recovering the electric energy generated by the actuation of a crown 3" (similar to that of the previously described embodiments) by a user of the device 1". To this end, the energy recovery means 19 are electrically connected to the accumulation means 20 and to motion detection means (which will be further described below). It must be pointed out that the motion detection means comprise (as in the previously described embodiments) a rotation detection sensor 13' and/or the translation sensor 18. In addition, said energy recovery means 19 are also in signal communication with the processing means 11 and are also configured for generating the rotation and/or translation signal and for transmitting it to the processing means 11 when the crown 3" is operated by the user of the device 1".

The energy recovery means 19 comprise a suitable circuitry that advantageously allows converting the current generated by the actuation of the motion detection means into a current having a direct voltage component sufficiently high to be accumulated into the accumulation means 20.

The accumulation means 20 may consist of a battery, preferably of the lithium-ion type, and/or a (super) capacitor of a type well known in the art. It must be pointed out that the accumulation means may also coincide with the (main) battery of the device 1", thus improving the operating time of the device 1".

For this purpose, the motion detection means 13' may comprise an electric generator, preferably an asynchronous permanent-magnet motor/generator, suitably sized for being housed inside the case 2 and being coupled to the shaft 31. This feature provides a rotary motion, possibly a clicking one, of the crown 3" and allows an electric current to be generated every time said crown 3" is turned. Furthermore, for reasons that will be explained below, the presence of an electric motor/generator machine having a high degree of reversibility (i.e., capable of operating both as a generator and as a motor without significant efficiency problems) also allows the crown 3" to rotate autonomously, so that, for example, the user of the device 1" can be instructed and/or invited to use the crown 3" instead of the touch-sensitive display (if present).

When the user operates the crown 3" (e.g., by turning it and/or extracting/inserting it from/into the case 2), the piezoelectric element 181 and/or the motion detection means 13' generate a current that flows through the energy recovery means 19, which will then perform the following actions:

- they will generate a rotation and/or translation signal and transmit it to the processing means 11, which will read and interpret it as already described for the previous embodiments;
- they will convert some current flowing through said energy recovery means 19 into a current having a direct voltage component sufficiently high to be accumulated into the accumulation means 20.

Therefore, if the user turns the crown 3" to select the icons shown on the screen displayed by the display means 15 or for any other reason (e.g., just for pleasure or for adjusting the phone audio volume or for browsing the electronic phone book), the energy recovery means 19 will recharge the accumulation means 20, thereby extending the operating time of the device, so that those users who are accustomed to using a traditional analog watch will find it easier to use and take care of the device 3", which, due to the presence of the processing means 11 and of the display means 15, will need to be recharged more frequently than a traditional analog watch. This will increase the number of potential users of the device 1".

In order to further extend the operating time of the device 1", the translation sensor 18 may also comprise an accelerometric mass 182 positioned on the piezoelectric element 181 and integral therewith, wherein said accelerometric mass 182 is configured for generating a force that will deform said piezoelectric element 181 when said device 1" is subjected to an acceleration due, for example, to the walking or running motion of the user of said device 1", so that the piezoelectric element 181 will generate a current that can be accumulated into the accumulation means also when the user is not operating the crown 3". In this manner, the device 1" will be recharged like a traditional analog watch equipped with an automatic recharge function, thus making it easier for those users who have no experience with smartphones to keep the device 1" operational, resulting in a larger number of potential users of the apparatus 1".

As mentioned above, the presence of an electric motor/generator 13" coupled to the shaft 31 allows rotating the crown 3", so as to teach and/or invite the user to use said crown 3". To do so, the energy recovery means 19 comprise a speed adjuster capable of supplying appropriate power to the motor/generator 13', taking energy from the accumulation means 20 or from another source. These features allow the processing means to be so configured as to cause the crown 3" to rotate when the user selects the icons without using said crown 3", e.g., by using the touchscreen. The user will thus be invited to control the device 1" through the crown 3", thereby advantageously recharging said device 1" and extending the operating time of the device 1", resulting in the already described evident beneficial effects.

The present description has tackled some of the possible variants, but it will be apparent to the man skilled in the art that other embodiments may also be implemented, wherein some elements may be replaced with other technically equivalent elements. The present invention is not therefore limited to the explanatory examples described herein, but may be subject to many modifications, improvements or replacements of equivalent parts and elements without departing from the basic inventive idea, as set out in the following claims.

The invention claimed is:

1. An electronic wrist or pocket watch comprising:
   a case;
   a display means for displaying a plurality of symbols;
   a processing means in signal communication with the display means, the processing means being configured for controlling said display means in a manner such that the display means will display a screen where a first symbol is selected from among a plurality of available symbols, the plurality of available symbols being displayed at a plurality of spaced apart locations on the screen, one of the plurality of spaced apart locations being a fixed, reserved location where the selected first symbol is disposed;
   a rotary crown associated with the case;
   a transmission shaft coupled to the rotary crown; and
   a motion detection means configured for detecting at least a rotary motion of said rotary crown,
   wherein:
      said motion detection means is in signal communication with the processing means, and
      said processing means is also configured for controlling the display means in a manner such that, when the rotary crown is turned, each of the plurality of available symbols are moved to a different one of the plurality of spaced apart locations so that a second symbol, different from the first symbol, will be selected from among the plurality of available symbols and will be disposed at the fixed, reserved location,
      the rotary crown is also configured in a manner such that the rotary crown can be moved along an axis of rotation of said rotary crown so that the rotary crown can be extracted from the case,
      the motion detection means comprises a translation sensor in signal communication with the processing means, the translation sensor being configured for detecting extraction of the rotary crown from the case,
      the translation sensor comprises a piezoelectric element coupled to said transmission shaft in such a manner that when the rotary crown is extracted from the case, said piezoelectric element is deformed, thereby generating an electric current that is detected by the processing means, and
      when any one of the plurality of available symbols that are at the spaced apart locations on the screen is selected by rotation of the rotary crown, the selected symbol is always located at the fixed, reserved location.

2. The watch according to claim 1, wherein the processing means is also configured in a manner such that, when the second symbol, which is located at one end of the plurality of spaced apart locations, is selected, turning the rotary crown in one of several possible directions will result in selection of a symbol located at an other end of the plurality of spaced apart locations.

3. The watch according to claim 1, wherein the rotary crown is insertable into the case.

4. The watch according to claim 3, wherein the translation sensor is further configured to detect insertion of the rotary crown into the case.

5. The watch according to claim 4,
   wherein when the rotary crown is inserted into the case, said piezoelectric element is deformed, thereby generating an electric current that is detected by the processing means.

6. The watch according to claim 5, wherein the translation sensor comprises also an accelerometric mass positioned on the piezoelectric element and integral therewith, wherein said accelerometric mass is configured for generating a force that will deform said piezoelectric element when said watch is subjected to an acceleration.

7. The watch according to claim 1, wherein the processing means is also configured for controlling the display means in a manner such that the processing means will generate the screen, which includes the plurality of available symbols, wherein the selected symbol is bigger than any other displayed symbols.

8. A method of use of the watch according to claim 1, comprising a selection step, wherein the second symbol is selected by turning the rotary crown.

9. The method according to claim 8, comprising an application activation step, wherein an application associated with the second symbol, when selected, is started by inserting and/or extracting the rotary crown into/from the case of said watch.

10. A method for recharging the watch according to claim 1, comprising a recharge step, wherein said watch is recharged by turning the rotary crown that operates an electric generator.

11. The watch according to claim 1, said processing means is also configured for controlling the display means in such a manner that when the rotary crown is turned, one of the plurality of available symbols displayed on the screen will disappear from the screen and a new symbol, not previously displayed, will be displayed on the screen at one of the plurality of spaced apart locations.

12. The watch according to claim 1, further comprising a feedback means allowing a user to hear the movement of the rotary crown.

13. The watch according to claim 1, wherein the rotary crown clicks when it is rotated.

14. An electronic wrist or pocket watch comprising:
   a case;
   a display means for displaying a plurality of symbols;
   a processing means in signal communication with the display means, the processing means being configured for controlling said display means in a manner such that the display means will display a screen where the plurality of symbols are displayed at a plurality of spaced apart locations on the screen;
   a rotary crown associated with the case;
   a transmission shaft coupled to the rotary crown,
   an electric motor disposed within the case and coupled with the rotary crown through the transmission shaft, the electric motor being in electrical communication with the processing means so that when one of the plurality of symbols displayed on the display means is selected, the electric motor rotates the rotary crown, and
   a motion detection means configured for detecting at least a rotary motion of said rotary crown, wherein:
   said motion detection means is in signal communication with the processing means,
   said processing means is also configured for controlling the display means in a manner such that, when the rotary crown is turned, each of the plurality of available symbols are moved to a different one of the plurality of spaced apart locations,
   the rotary crown is also configured in a manner such that the rotary crown can be moved along an axis of rotation of said rotary crown so that the rotary crown can be extracted from the case, and
   the motion detection means comprises a translation sensor in signal communication with the processing means, the translation sensor being configured for detecting extraction of the rotary crown from the case.

15. The watch according to claim 14, wherein the electric motor rotates the crown when the one of the plurality of symbols displayed on the display means is selected by touching the display means.

* * * * *